United States Patent [19]

Hin

[11] Patent Number: 5,678,008
[45] Date of Patent: Oct. 14, 1997

[54] SIGNALING PROTOCOL SUPPORTING MULTIMEDIA SERVICES EMPLOYING AN AUTOMATION WITH MULTIPLE STATES AND A STATE MATRIX INDICATING THE STATES OF MULTIPLE ENTITIES

[75] Inventor: To Hin, Paris, France

[73] Assignee: Alcatel Cit, Paris, France

[21] Appl. No.: 424,285

[22] PCT Filed: Sep. 1, 1994

[86] PCT No.: PCT/FR94/01032

§ 371 Date: Apr. 20, 1995

§ 102(e) Date: Apr. 20, 1995

[87] PCT Pub. No.: WO95/06991

PCT Pub. Date: Mar. 9, 1995

[30] Foreign Application Priority Data

Sep. 2, 1993 [FR] France ................................. 93 10471

[51] Int. Cl.⁶ ........................................................ G06F 3/00
[52] U.S. Cl. ........................ 395/200.12; 370/62; 370/944
[58] Field of Search ............................... 395/200.12, 375; 370/60.1, 94.1, 62, 17

[56] References Cited

U.S. PATENT DOCUMENTS

| | | | |
|---|---|---|---|
| 4,630,265 | 12/1986 | Sexton | 370/85 |
| 4,905,231 | 2/1990 | Leung et al. | 370/94.1 |
| 5,195,086 | 3/1993 | Baumgartner et al. | 370/62 |
| 5,343,470 | 8/1994 | Hideshima et al. | 370/85.1 |
| 5,473,603 | 12/1995 | Iwata | 370/60 |

OTHER PUBLICATIONS

*Globecom '91*, vol. 1, 1991, New York US, pp. 223–227, Whay Chiou Lee et al, "Integrated Packet Networks with Quality of Service Constraints".

*IEEE Transactions on Communications*, vol. 39, No. 12, Dec. 1991, New York, US, pp. 1875–1885, Guy Vonderweidt et al, "A Multipoint Communication Service for Interactive Applications".

*Primary Examiner*—Richard L. Ellis
*Assistant Examiner*—Gautam R. Patel
*Attorney, Agent, or Firm*—Sughrue, Mion, Zinn, Macpeak & Seas

[57] ABSTRACT

This protocol consists in, among other things, updating in all the terminals and in all the nodes of the telecommunication network which a given call concerns a matrix representing the status of each terminal (TA, TB, TC) which is a party to the call in question vis-a-vis each connection (C1, C2, C3) set up for the call in question. This matrix distinguishes a plurality of fine states within the active state of each of the terminals and the nodes that this call concerns. This matrix is generally updated by means of a message which is broadcast throughout the network when an operation is executed in one of the terminals and modifies: the state of this call, or of a connection set up for this call, or of a terminal participating in this call.

3 Claims, 9 Drawing Sheets

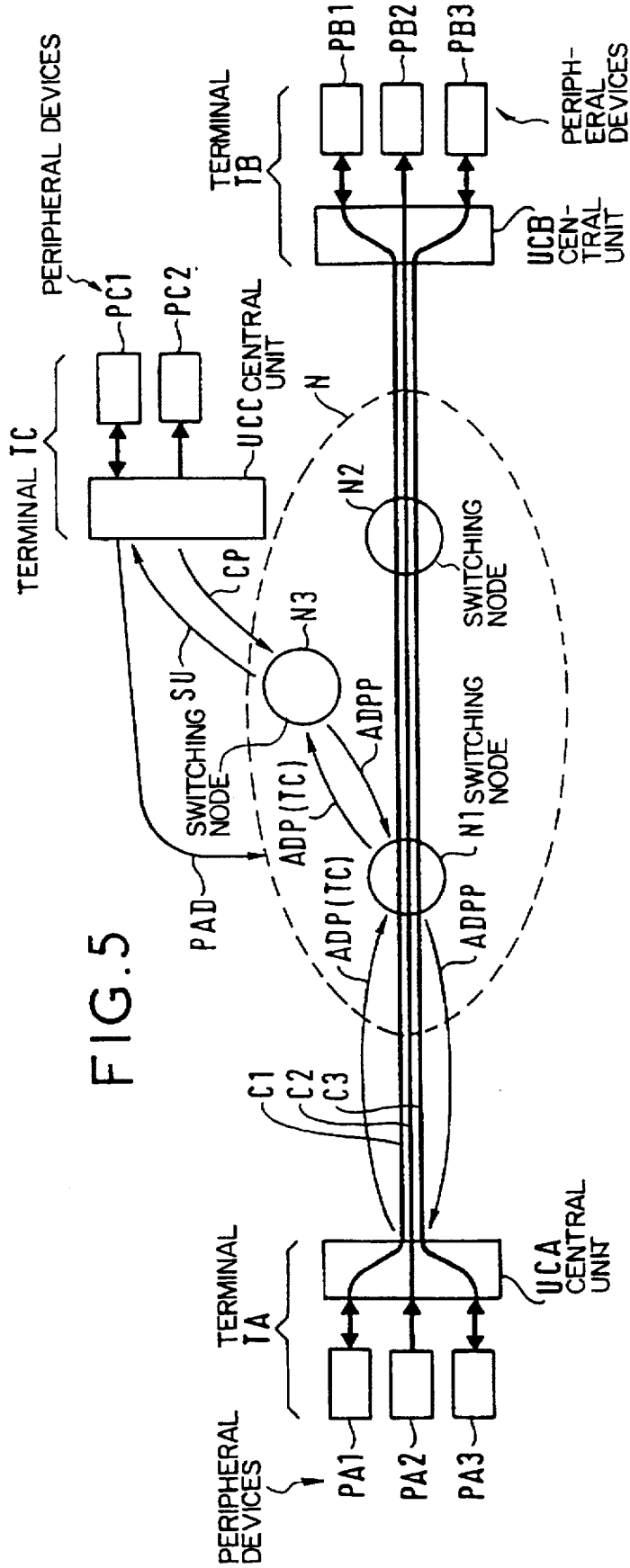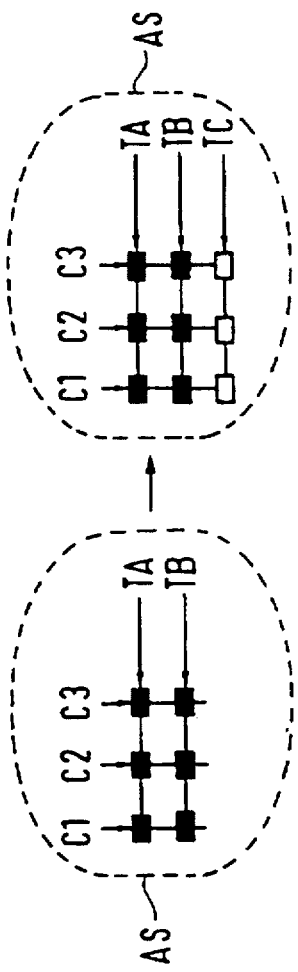

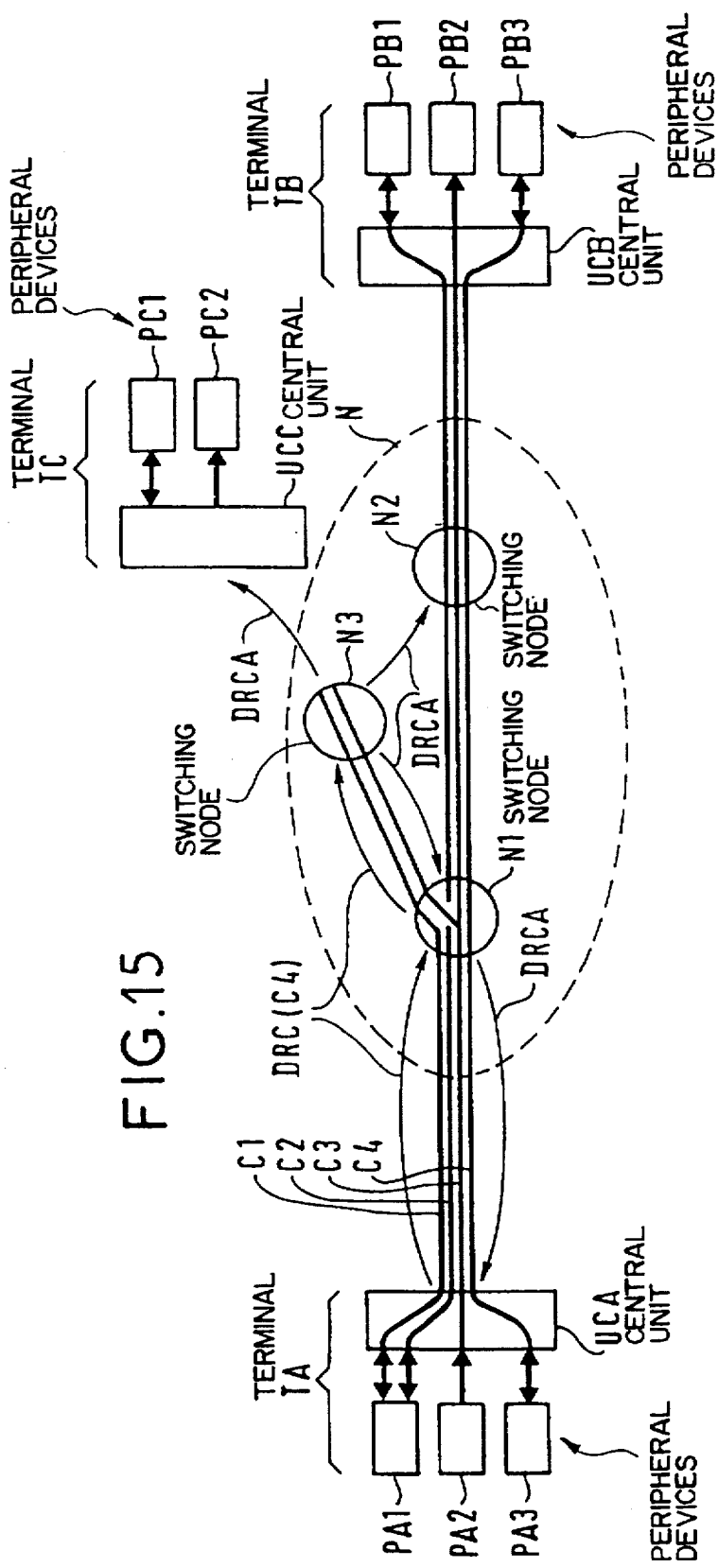
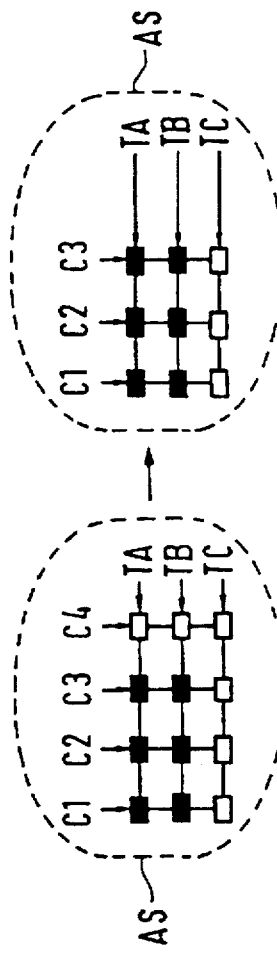
FIG.15
FIG.16

SIGNALING PROTOCOL SUPPORTING MULTIMEDIA SERVICES EMPLOYING AN AUTOMATION WITH MULTIPLE STATES AND A STATE MATRIX INDICATING THE STATES OF MULTIPLE ENTITIES

BACKGROUND OF THE INVENTION

The invention concerns a signalling protocol supporting multimedia services for a telecommunications network including a plurality of entities which are either terminals or switching nodes setting up connections between these terminals when a call is set up. Some of these terminals are called multimedia terminals because they include peripheral devices and interfaces providing in parallel a plurality of services corresponding to different media, such as sending or receiving video pictures, sound or data. The telecommunications network is then a broadband network to allow transmission of data at high bit rates, for example an asynchronous transfer mode (ATM) network. To connect a given multimedia terminal to another multimedia terminal or to a plurality of other terminals dedicated to respective different media such as video pictures, sound and data it is necessary to use either a plurality of connections or a single connection onto which a plurality of channels are time-division multiplexed.

The International Telecommunications Union (ITU) is currently preparing a recommendation (Q.93 B) for a signalling protocol supporting a single connection between two terminals in a broadband integrated services telecommunication network.

In the future it will be desirable for multimedia terminals to be attachable to a plurality of connections to set up the following types of call:

unidirectional point-to-multipoint between a multimedia terminal which is the only sender and other multimedia terminals which are all receivers;

bidirectional multipoint between a plurality of multimedia terminals which can send to a plurality of terminals simultaneously and receive from a plurality of terminals simultaneously.

SUMMARY OF THE INVENTION

An object of the invention is therefore to propose a protocol capable of handling:

A multiconnection call, i.e. the setting up or clearing down of a plurality of connections in the same call.

A multiparty call in which more than two multimedia terminals can communicate interactively during the same call.

A call which is both a multiconnection call and a multiparty call.

A modification to the characteristics of the connection during the active phase following setting up of the connection.

Another object of the invention is to propose a protocol based on the Q.93B protocol and which is upwards compatible with this prior art protocol.

The invention consists in a signalling protocol supporting multimedia services for a telecommunications network including a plurality of entities: terminals, including multimedia terminals, and switching nodes setting up connections between these terminals when a call is set up; each entity including a signalling device for sending and receiving signalling messages; this protocol consisting in activating, in the signalling device of a first entity, which is a party to a call, an automaton which can be in:

a stable idle state, to which it returns when the call is cleared down;

an active stable state which it enters when the call is set up;

this protocol being characterized in that it further consists in:

having this automaton change from the active stable state to a first unstable state when a first entity sends or forwards a request addressed to a second entity, this request asking for execution of an operation of a first type;

then having this automaton change from the first unstable state to a second unstable state when the first entity receives a local acknowledgment indicating that the request has been received by the second entity or has been received and then forwarded by an intermediate entity between the first and second entities;

then having this automaton change from the second unstable state to the active stable state when the first entity receives either a global acknowledgement indicating that the operation requested has been executed by the second entity or a message indicating that the request has been rejected by the second entity or an intermediate entity;

having this automaton change from the active stable state to a third unstable state when a first entity sends or forwards a request addressed to a second entity, this request asking for the execution of an operation of the second type;

then having this automaton change from the third unstable state to the active stable state when the first entity receives either a local acknowledgement indicating that the request has been received from the second entity or has been received and then forwarded by an intermediate entity between the first and second entities;

and in that it further consists in:

subdividing each state of said automaton into a plurality of fine states respectively defined by values of a matrix whose columns correspond to respective connections set up for this call; the rows of which correspond respectively to the terminals which are parties to this call; and containing binary data representing the status of each terminal vis-a-vis each connection set up for this call;

memorizing at least part of this matrix in the signalling device of each entity which a call concerns;

updating the matrix of the automaton of each of the entities that an operation concerns when this entity receives a message concerning this operation and the message indicates a change of state of a terminal which is a party to the call in question vis-a-vis this call and/or vis-a-vis the connections set up for this call;

using this matrix as a variable for this protocol.

The protocol characterized as above is compatible with Recommendation Q.93B as it uses an automaton one subsystem of which is identical to the automaton used in the Q.93B protocol. An advantage of the protocol of the invention is thus that it enables connection of a single-connection multimedia terminal to a node using the protocol of the invention. Another advantage is that it can be used between the nodes on a network.

BRIEF DESCRIPTION OF THE DRAWINGS

The invention will be more clearly understood and other features of the invention will emerge from the following description and the accompanying figures:

3

Figure 1:
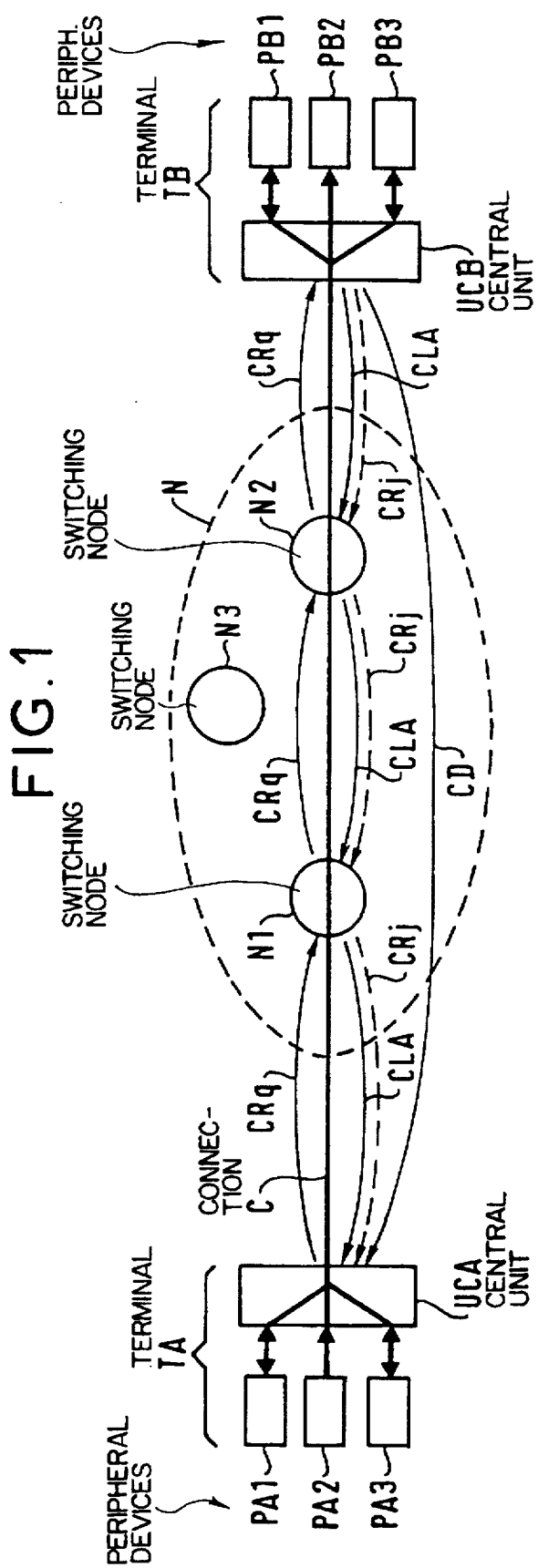
Figure 2:
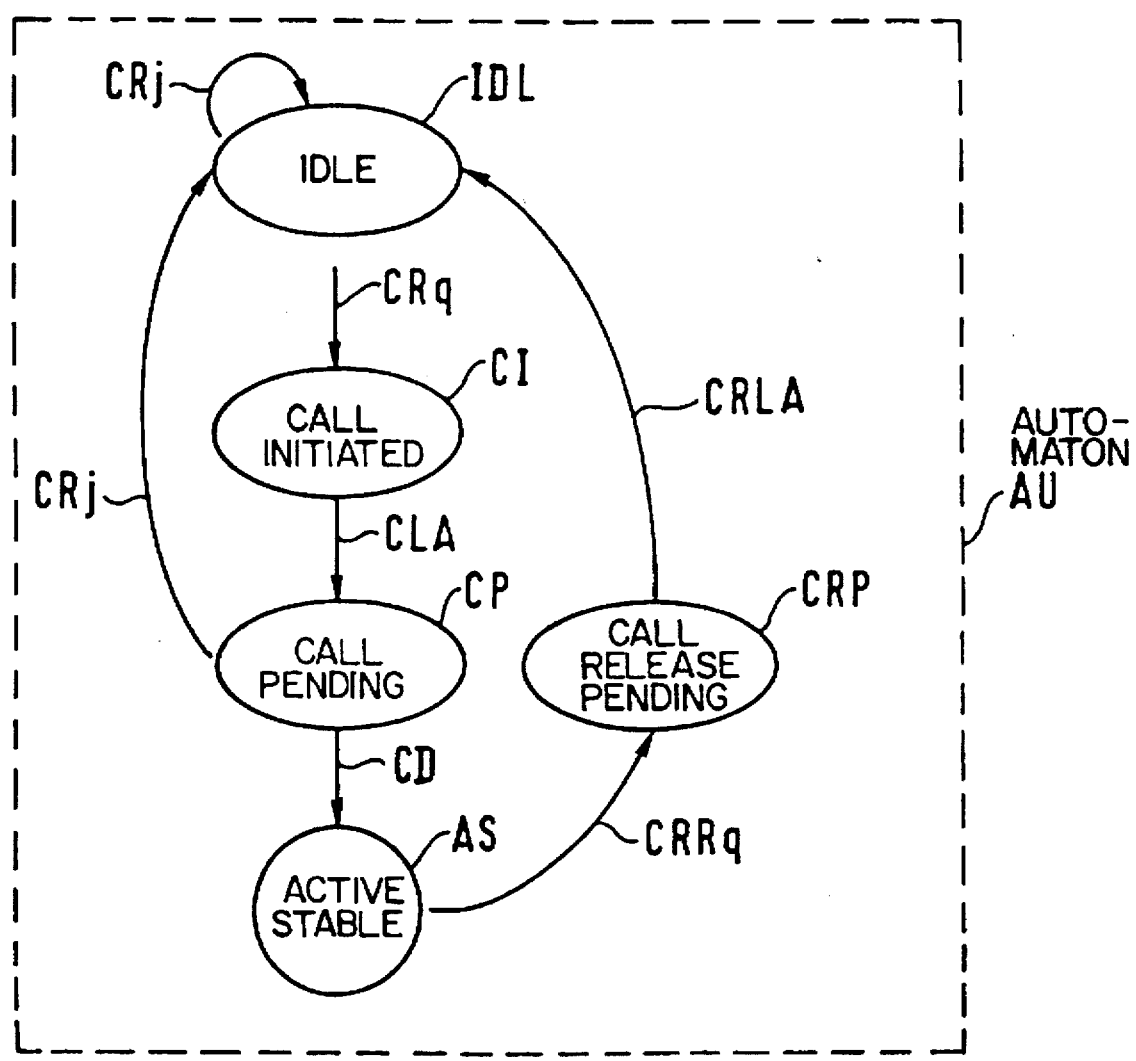
Figure 3:
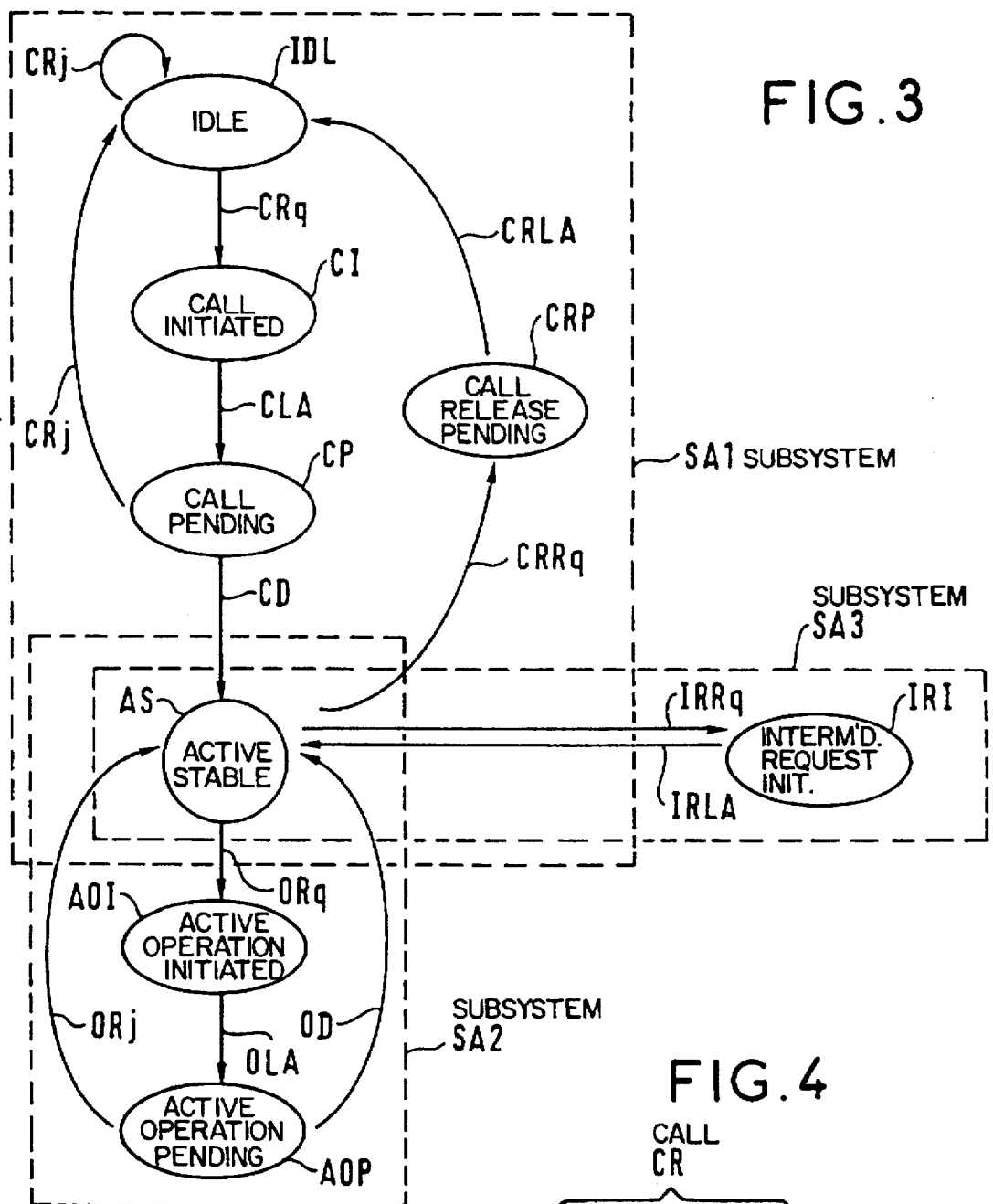
Figure 4:
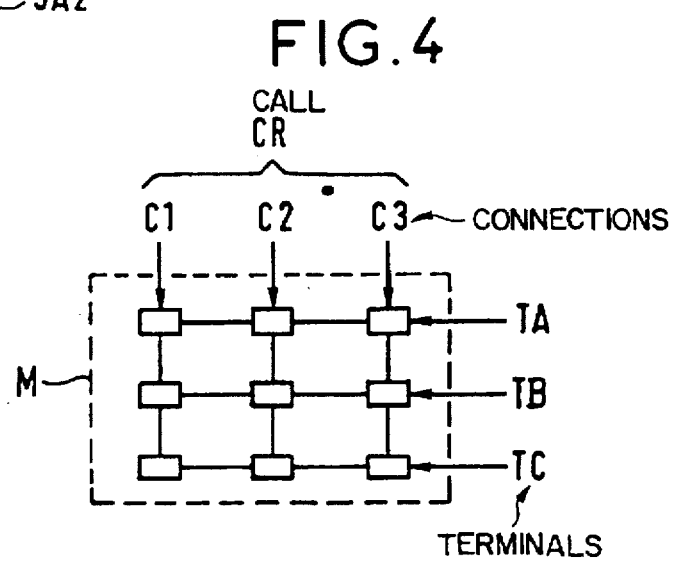
Figure 7:
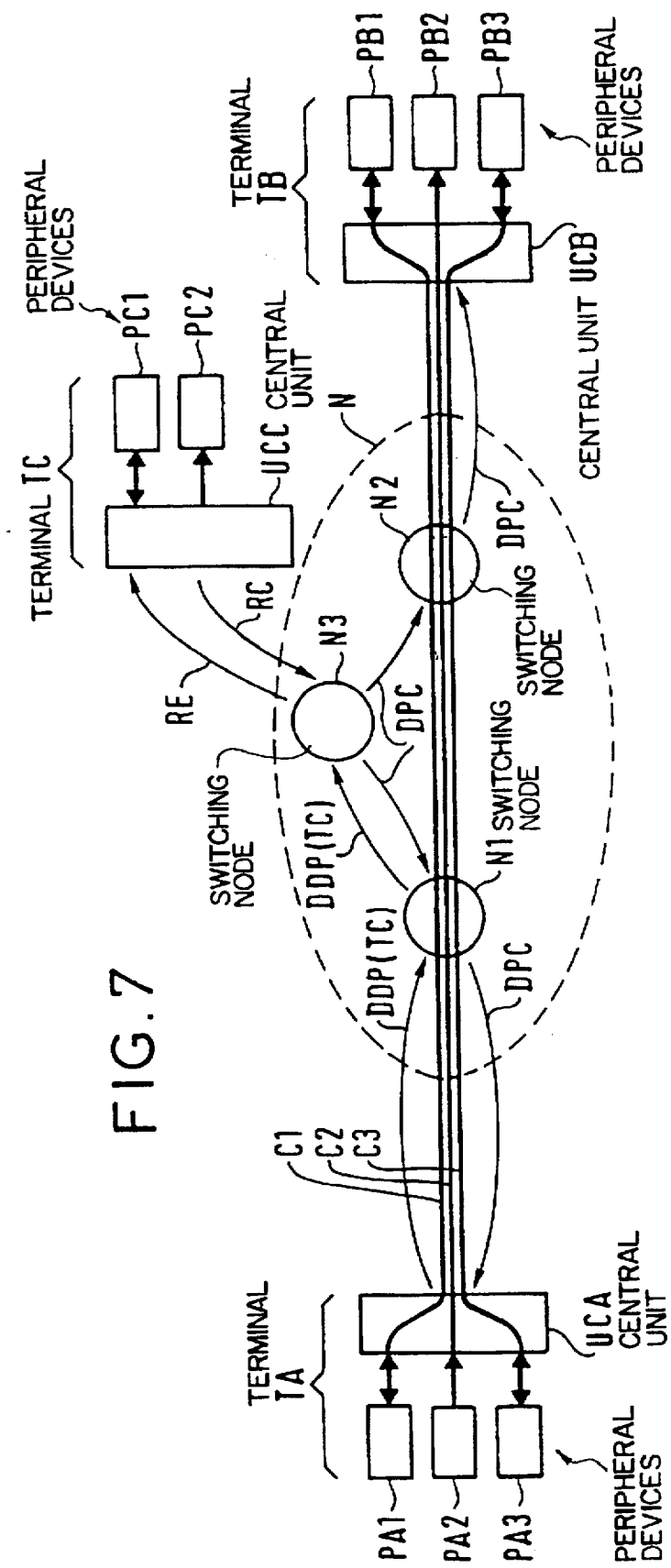
Figure 8:
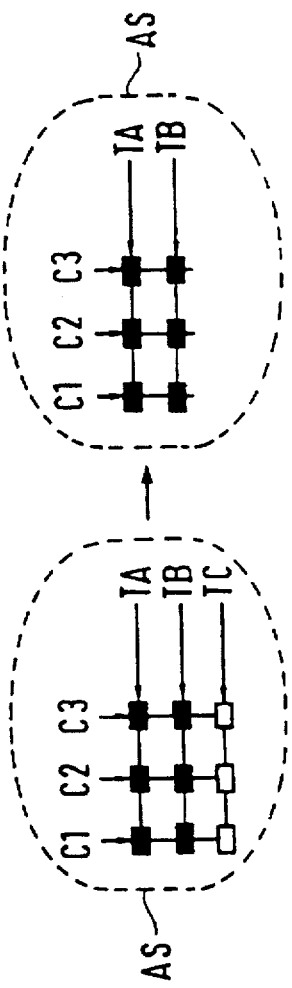
Figure 9:
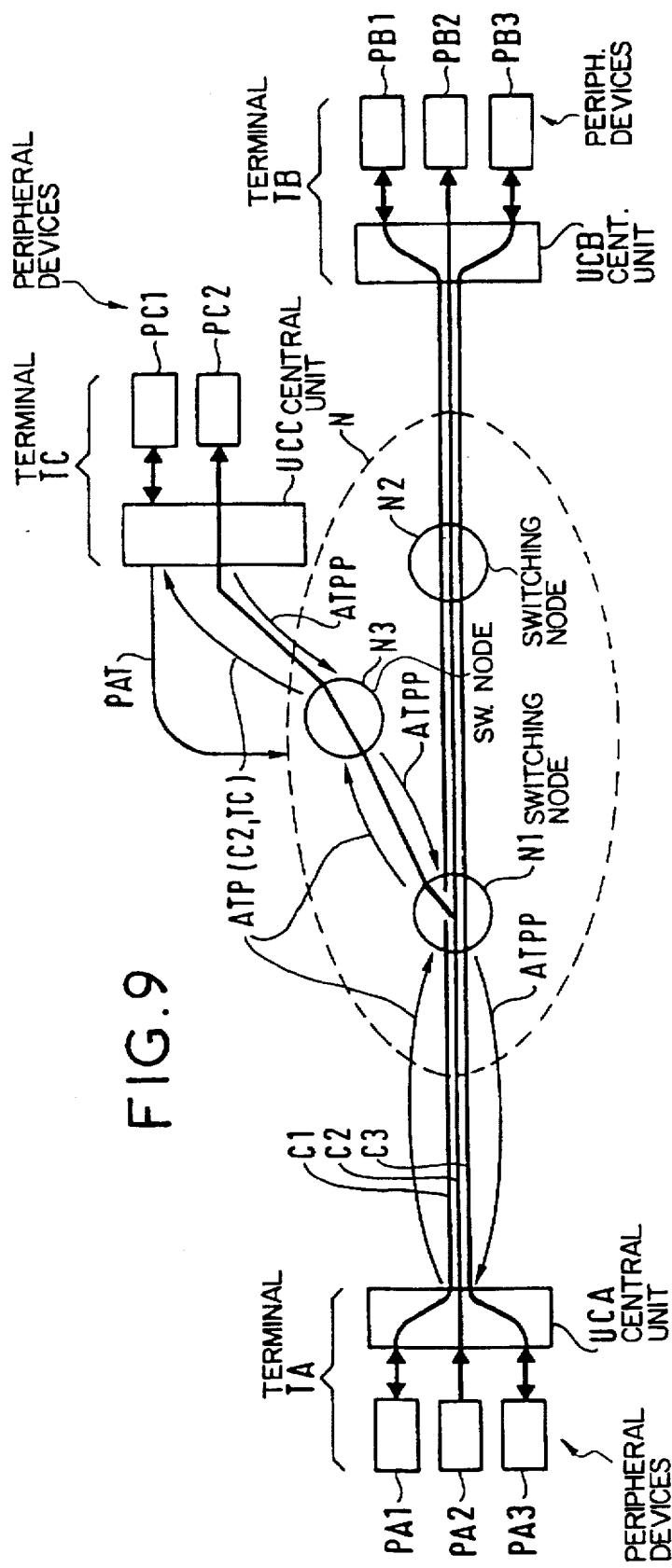
Figure 10:
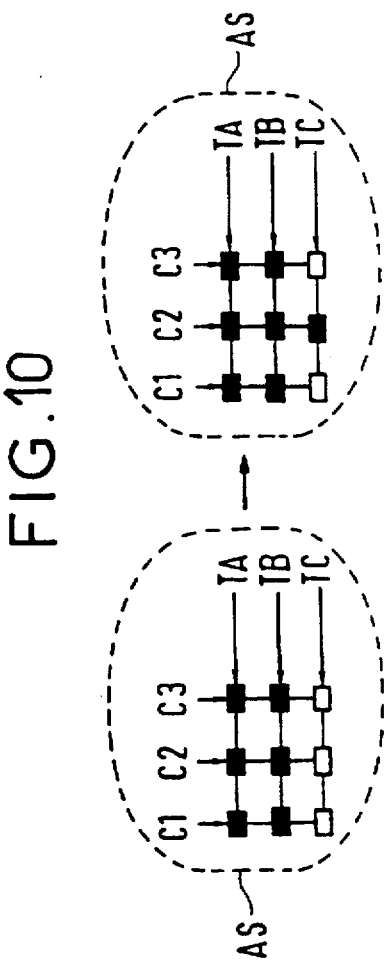
Figure 11:
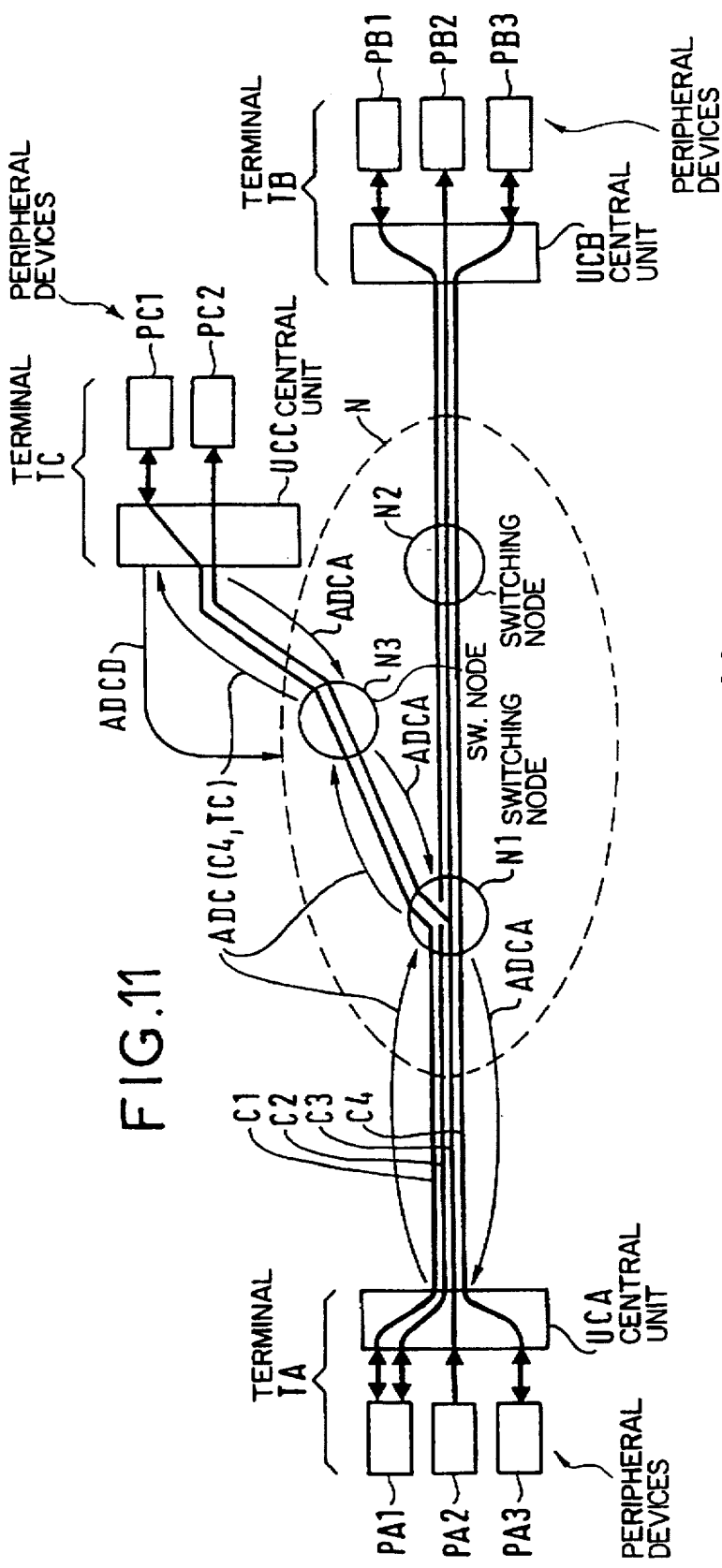
Figure 12:
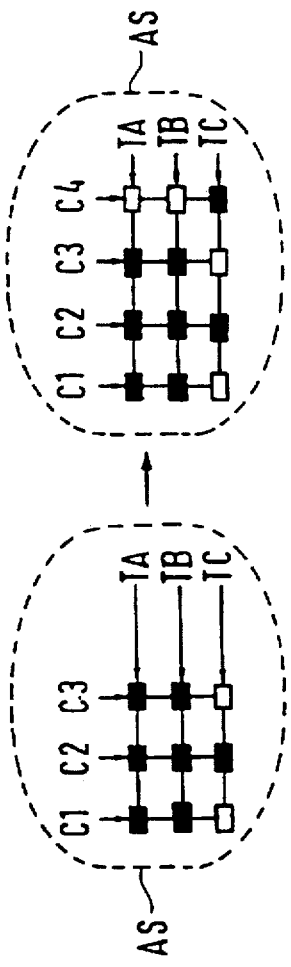
Figure 13:
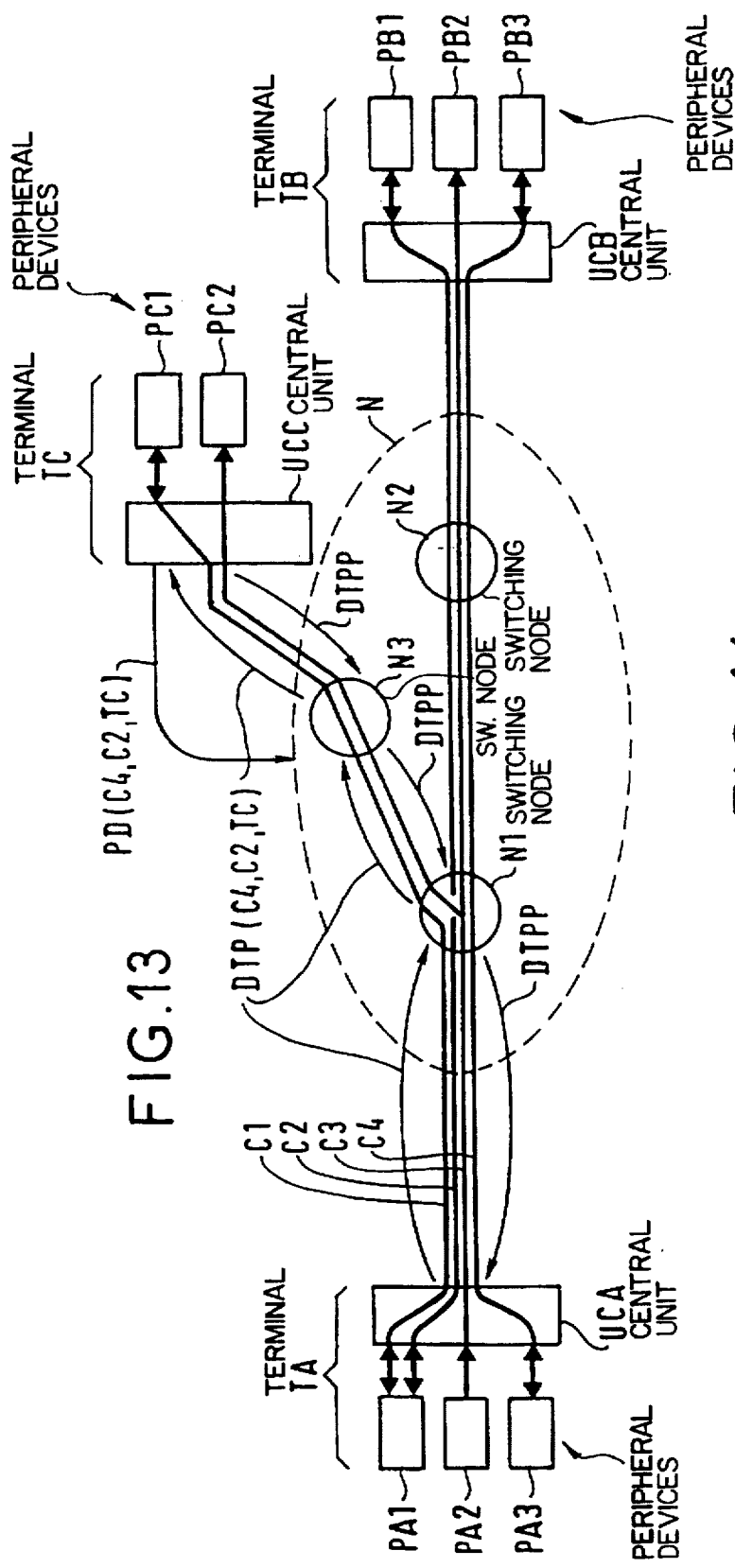
Figure 14:
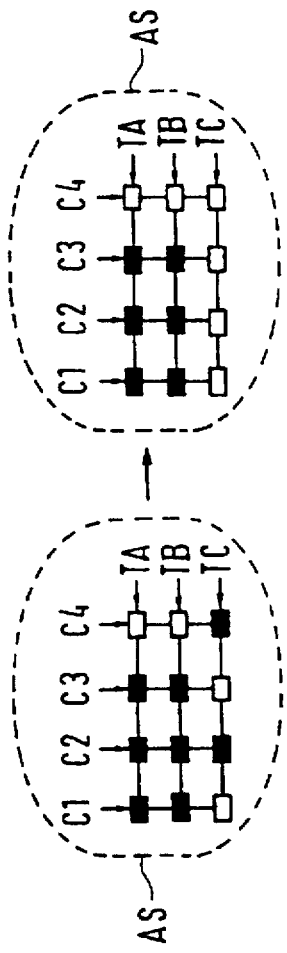

FIGS. 1 and 2 show one example of implementation of the Recommendation Q.93B protocol, respectively showing messages exchanged and changes of state of an automaton which is activated in each node and each terminal to which a call relates, during call setup and when a connection is requested;

FIG. 3 is a diagram of changes of state of an automaton which is activated in each node and in each terminal when using the protocol of the invention;

FIG. 4 is a diagram showing the matrix used in the protocol of the invention to define fine states which are subdivisions of the states of this automaton;

FIG. 5 shows one embodiment of the protocol of the invention, showing the messages exchanged in the case of an operation consisting in inviting a terminal to become a party to a call that has already been set up;

FIG. 6 shows how the matrix is modified in this case;

FIG. 7 shows an embodiment of the protocol of the invention in the situation of the converse operation, i.e. inviting a terminal to cease being a party to a call;

FIG. 8 shows the modification to the matrix in this case;

FIG. 9 shows an embodiment of the protocol of the invention in the case of an operation consisting in attaching a terminal which is a party to a call to a connection that already exists and which is a party to the same call;

FIG. 10 shows how the matrix is modified in this case;

FIG. 11 shows one embodiment of the protocol of the invention in the case of an operation consisting in attaching a terminal which is a party to a call to a connection specially created at the time;

FIG. 12 shows how the matrix is modified in this case;

FIG. 13 shows an embodiment of the protocol of the invention in the case of an operation consisting in detaching a terminal from two connections whilst it remains a party to the call which is the proprietor of these connections;

FIG. 14 shows how the matrix is modified in this case;

FIG. 15 shows an embodiment of the protocol of the invention in the case of an operation consisting in clearing down a connection which is no longer being used by a call; and FIG. 16 shows how the matrix is modified in this case.

DETAILED DESCRIPTION OF THE INVENTION

FIG. 1 shows one implementation of the Recommendation Q.93 protocol for carrying out an operation consisting in setting up a call between a terminal TA and a terminal TB. This operation includes the setting up of a single connection C. The terminal TA comprises a central unit UCA and three peripheral devices PA1, PA2, PA3 respectively dedicated to sending/receiving data, to sending video pictures and to sending/receiving sound. The central unit UCA handles time-division multiplexing and demultiplexing whereby the three types of signal are conveyed on the single connection C. The terminal TB comprises a central unit UCB and three peripheral devices PB1, PB2, PB3 respectively dedicated to sending and receiving data, receiving video pictures and sending and receiving sound. The central unit UCB handles the demultiplexing and multiplexing needed for sending the three types of information on the single connection C. The two terminals communicate via a set N of switching nodes N1, N2, N3 and transmission links (not shown ).

In this example, the network is a broadband network transmitting all the data in the form of asynchronous transfer mode (ATM) cells. Each terminal TA, TB and each node N1, N2, N3 includes a signalling device able to send and receive signalling messages in the form of cells similar to the cells conveying data between two terminals. These ATM cells have a standardized format. Each signalling device can comprise a processor and a program memory commanding the execution of signalling operations in accordance with the signalling protocol.

FIG. 1 shows the sending and receiving of messages by the terminal and by the nodes of a network N during the operation consisting in setting up a call and the connection C using the Recommendation Q.93B protocol.

When the terminal TA requests setting up of the call and the connection, its signalling device sends a signalling message CRq (CALL REQUEST). This message is routed by the nodes N1 and N2 to the terminal TB using routing information contained in the signalling message which is translated by each of the nodes N1 and N2.

When the message CRq is received by the node N1 and then by the node N2 and then by the terminal TB, the signalling devices of these entities each send a local acknowledgement message CLA (CALL LOCAL ACK.), addressed to the entity which sent the message CRq, and then resend the message CRq to the destination terminal TB. The terminal TA is thus advised that the node N1 has received its message and was able to forward it. The node N1 is then advised that the node N2 has received its message and was able to forward it. The node N2 is then advised that the terminal TB has received the message and can execute the requested operation.

The terminal TB also sends a signalling message CD (CALL DONE) which is a global acknowledgement broadcast to all the entities on the network. It is received by the terminal TA, for example, which is thus advised that the terminal TB has received the message CRq requesting execution of an operation and that the terminal TB has carried out that operation.

If any obstacle makes it impossible to carry out the requested operation, the terminal TA usually receives a signalling message CRj (CALL REJECTED) which is sent by the node N1 if the obstacle is at the node N1 or by the node N2 if the obstacle is at the node N2 or by the terminal TB if the obstacle is at the terminal TB. The figure shows the transmission of the messages CRj by dashed line arrows, to distinguish it from the transmission of the messages CLA and CA which concern the situation in which the operation is progressing correctly.

FIG. 2 is a diagram showing state changes of an automaton AU which is activated throughout the signalling device of each entity which sends or forwards a message requesting setting up or clearing down of a call and a connection. The automaton AU is specific to a call. This diagram has: a first part which represents the state changes when the signalling device sends a message CRq requesting setting up of a call and of a connection; and a second part which represents the state changes when the signalling device sends a message CRRq (CALL RELEASE REQUEST) requesting clearing down of a call and of the corresponding single connection.

In the first part of the diagram the automaton AU is in an idle state IDL (IDLE) before sending the signalling message CRq. It changes to an unstable state CI (CALL INITIATED) when the signalling device sends the message CRq. When the signalling device receives the local acknowledgement message CLA indicating that the request has been received by the node N1 and that it will be forwarded to the destination terminal the automaton AU enters an unstable state CP (CALL PENDING). Finally, it enters a stable state AS (ACTIVE STABLE) when the signalling device receives the global acknowledgement CD telling it that the call and the corresponding connection have been set up. If the node N1 cannot route the message CRq it responds with the message CRj. The automaton AU of the terminal TA remains in the idle state IDL. If the signalling device receives a message CRj indicating that the call has not been set up at N2 or TB the automaton AU changes from the CP state to the IDL state.

The CI and CP states are unstable for the following reasons: a signalling device of the terminal TA starts two time-delays when it sends a signalling message CRq. The local acknowledge message CLA must be received before the expiry of the first time-delay and the global acknowledgement message CD must be received before the expiry of the second time-delay. Absence of either of these two acknowledgement messages within these time-delays initiates a defense procedure.

The second part of the state diagram refers to the signalling device requesting execution of the converse operation to that described above, i.e. the clearing down of a call together with the clearing down of the corresponding single connection. This operation is simpler than call set-up. It uses only two messages instead of four: when a signalling device sends or forwards a message CRRq (CALL RELEASE REQUEST) from the stable state AS to request a destination entity to clear down the corresponding call, the automaton of this signalling device enters an unstable state CRP (CALL RELEASE PENDING). When the signalling device thereafter receives a local acknowledgement message CRLA (CALL RELEASE LOCAL ACK.), its automaton returns to the idle state IDL without waiting for a local acknowledgement message. During the clearing down of a call and of its connection, the risk of non-transmission of the request to the destination entity is regarded as low and of no importance.

The operation to set up a call and a connection described above is of the so-called "four message" type since it uses four messages: CRq, CLA, CD, CRj. The operation of clearing down a call and a connection described above is of the so-called "two message" type as it uses only two messages: CRRq and CRLA. There is no provision for it being impossible to clear down the call and the connection, and there is therefore no message equivalent to ORj.

The protocol of the invention also entails activating an automaton in the signalling device of each entity which sends or forwards a message requesting execution of an operation. However, this automaton is more complex because the operation of setting up a call is dissociated from the operation of inviting a terminal to become a party to the call and the operation of stabilizing a connection. Similarly, the converse operations are dissociated to enable modification at any time of the number of terminals which are parties to a call and the number of connections between those terminals.

FIG. 3 is a diagram showing state changes of the automaton which is activated when using the protocol of the invention. It has some features common to the AU automaton implementing the Recommendation Q.93B protocol. It includes:

A subsystem SA1 which is identical to the first part of the FIG. 2 diagram as it comprises the states IDL, CI, CP, AS. It is involved only in call set-up and clearing down and is not involved in connections. Other subsystems handle the various other operations arising out of the multiparty and multiconnection nature of a call.

A subsystem SA2 which is similar to the first part of the FIG. 2 diagram as this subsystem SA2 is involved if a four message type operation is requested by the signalling device from the stable state AS corresponding to a call that has been set up (stable call). It comprises three states: AS, AOI and AOP.

A subsystem SA3 which is similar to the second part of the FIG. 2 diagram as this subsystem SA3 is involved in any operation of the type where two messages are requested by the signalling device from the stable state AS corresponding to a call that has been set up (stable call). It comprises two states: AS and IRI.

Referring to FIG. 3, the messages operative in the subsystems SA2 and SA3 are referenced generically. Typical messages are described below.

The subsystem SA2 behaves as follows: if the signalling device of a network entity sends or forwards a message ORq (OPERATION REQUEST) requesting execution of an operation of the four-message type, the automaton of this signalling device, specific to the call and to the operation requested, leaves the stable state AS corresponding to the fact that the call has already been set up. It enters an unstable state AOI (ACTIVE OPERATION INITIATED) in which it waits for the entity to which it has supplied the message ORq to tell it that it has received the message and can route it towards the destination entity, if this is an entity other than itself.

If the signalling device receives a local acknowledgement message OLA (OPERATION LOCAL ACK.), the automaton then enters an unstable state AOP (ACTIVE OPERATION PENDING). If the signalling device then receives a global acknowledgement message OD (OPERATION DONE) telling it that the operation has been completed by the entity to which the request is addressed, the automaton goes back to the stable state AS (ACTIVE STABLE) to await other requests for other operations.

If the signalling device receives a message ORj (OPERATION REJECTED) instead of the message OD, this shows that the request has not been forwarded as far as the destination entity or that the latter is unable to carry out the requested operation. The automaton remains in or returns to the stable state AS as the call is set up anyway.

The subsystem SA3 behaves as follows: when the signalling device of a network entity sends or forwards a message IRRq (INTERMEDIATE RELEASE REQUEST) requesting implementation of an operation of the two message type, the automaton of the signalling device specific to this call and to this operation quits the stable state AS corresponding to the fact that the call has already been set up and enters an unstable state IRI (INTERMEDIATE REQUEST INITIATED). It then waits for the entity to which it passed the message IRRq to tell it that it can forward the message IRRq to the destination entity, unless it is itself the destination entity.

When the signalling device receives the local acknowledgement message IRLA (INTERMEDIATE RELEASE LOCAL ACK.), the automaton returns to the stable state AS. There is no global acknowledgement message which would indicate that the operation has been completed in the case of operations of the two message type. Nor are there any messages for rejecting the request.

Other similar automata undergo similar changes of state in any terminal or any node of the network when sending or forwarding a signalling message requesting another entity to carry out an operation.

There are also simple operations known as one message operations which consist in carrying out an operation requested in a message received by the entity from a given state and returning to the same state after execution in the entity concerned. These transitions from one state to the same state are not shown in FIG. 3.

The states of these automata are subdivided into fine states by means of a matrix defining fine states to allow for the status of each terminal vis-a-vis each connection. A matrix of this kind is memorized in the signalling device of each entity of the network which the call concerns. In the case of a multipoint call the matrix is stored identically in all the entities, nodes or networks, involved in a call because all these entities need to know the status of each terminal vis-a-vis this call and vis-a-vis all the connections set up for the call. The matrix is constantly updated.

In the case of a point-to-multipoint call a single terminal, that which sends data, needs to memorize a complete matrix. The other, receiving only terminals memorize and update only the simplified matrix which indicates only the status of this terminal vis-a-vis the call and vis-a-vis the connection set up for the call. Each node memorizes a matrix which is simplified to a greater or lesser degree according to the node, as it memorizes only the status of the terminals accessible via this node vis-a-vis the call and vis-a-vis the connections set up for the call.

FIG. 4 is a diagram showing the matrix M defining fine states for a given call in an example in which the call is of the multipoint type. This call CR comprises three connections C1, C2, C3 and three terminals TA, TB, TC are parties to the call. In this example the presence of three rows of the matrix corresponding to the terminals TA, TB, TC indicates that the three terminals are parties to the call CR which corresponds to this matrix and the presence of three columns corresponding to the connections C1, C2, C3 indicates that the call comprises three connections at the time in question.

The value of the binary data located at the intersection of the columns corresponding to the connections C1, C2, C3 with the rows corresponding to the terminals TA, TB, TC represents the attachment of a terminal to a connection or the absence of attachment of a terminal to a connection.

A matrix of this kind can be used to distinguish fine states in the states of automata specific to all types of operation. Thus is it not necessary to memorize a matrix for each operation. The matrix constitutes a variable for the protocol. The signalling device of each entity acts according to this variable, for example to match this or that terminal to this or that connection.

The matrix is memorized in the signalling device of each entity which the call concerns in a random access memory addressed by: a reference designating the call; a reference designating a connection; and a reference designating a terminal.

This matrix is updated in each entity which the call CR concerns when its signalling device receives a message concerning the call CR and this message indicates a change of state of the call CR or of a terminal which is party to the call CR vis-a-vis a connection set up for the call CR or a change of state for a connection set up for the call CR. The use of this matrix will be more clearly understood from the following description of examples of operation in the case of a call concerning a plurality of multimedia terminals.

In the context of the protocol of the invention terminals which are party to a call do not all have the same rights. Some of these rights depend on the type of call set up between the terminals. A distinction is drawn between: unidirectional or bidirectional point-to-point calls between two terminals only; unidirectional point-to-multipoint calls; and bidirectional multipoint calls.

The terminal which requests the setting up of a call is referred to as the proprietor of the call and has exclusive rights:

to invite at least one other terminal to be a party to the call;

to invite at least one other terminal to no longer be a party to the call;

to clear down the call.

It also has the right to transfer all the above rights to another terminal which is a party to the call if the call request sets up a bidirectional multipoint call.

The other terminals which are parties to the call, but which do not request it to be set up, are referred to as terminals which are not proprietors of the call. In the case of a point-to-point call between two terminals, a calling terminal and a called terminal, the calling terminal is the terminal which is the proprietor of the call and the called terminal is the terminal which is not the proprietor of the call. In the case of a unidirectional point-to-multipoint call between a terminal sending data and a plurality of terminals receiving data, the sending terminal is the terminal which is the proprietor of the call and the terminals receiving data are the terminals which are not proprietors of the call. In the case of a bidirectional multipoint call between a plurality of terminals which all send and receive data, the proprietor of the call is the terminal which requested setting up of the call, all the other terminals being terminals that are not proprietors of the call. However, the proprietor can transfer all his rights to one of the other terminals which are parties to the call because they can all send and receive data.

A terminal which is not a proprietor of the call can request its detachment from a call regardless of the call type.

There are various types of connection:

unidirectional point-to-point, bidirectional point-to-point, a distinction being drawn between a symmetrical connection which has the same characteristics in both directions and an asymmetrical connection which has at least one different characteristic in the two directions, for example the bandwidth or the quality of service;

unidirectional point-to-multipoint.

A terminal which is a party to a call which requests the setting up of a connection to at least one other terminal which is a party to the same call is called the proprietor of this connection and has the exclusive right to allocate a reference to the connection. It also has the following rights:

to invite one or more other terminals which are parties to the call to be attached to the connection;

to invite one or more other terminals which are parties to the call to be detached from the connection;

to request the network and the terminals attached to the connection to modify the characteristics of the connection;

to request the clearing down of the connection.

A terminal which is attached to a connection but which is not the proprietor of the connection has only the right to be detached from the connection at any time. If the terminal which is the proprietor of a connection is detached from the connection, it does not have the right to transfer its previous rights to another terminal which is attached to the connection, in particular to avoid any problem with billing.

The allocation of certain exclusive rights to the terminal which is the proprietor of the call and of certain exclusive rights to the terminal which is the proprietor of a connection has the advantage of considerably simplifying the semantics of signalling messages. The status of proprietor or nonproprietor of a call or a connection can be deduced from the nature of the message, rather than stated explicitly in the message.

All signalling messages sent by the signalling device of an entity of the network include: a reference designating this entity, a reference designating the call which the message concerns and possibly a reference designating another (destination) entity, or a connection reference. The reference designating a call is chosen at the time of call set-up by the terminal requesting setting up of the call. This reference has a local meaning only. This reference is translated in each node which forwards the message. The reference designating a network entity for a given call is allocated by the terminal which is the proprietor of the call and has a global meaning throughout the network. The reference designating the connection is allocated by the terminal which is the proprietor of the connection when it requests setting up of the connection. Its meaning is global, i.e. it is recognized throughout the telecommunication network for the call in question.

The protocol of the invention supports the following operations:

Grouping of connections which follow the same route.

Setting up of a call between two terminals for one or more point-to-point, unidirectional or bidirectional, symmetrical or asymmetrical connections; with or without a procedure verifying that the called terminal conforms to the requirements in terms of resources expressed by the requester terminal.

Setting up of a call between more than two terminals for one or more unidirectional point-to-multipoint connections; with or without a procedure for verifying that a called terminal conforms to the requirements in terms of resources expressed by a calling terminal.

Inviting one or more other terminals to be parties to an existing call, with or without attachment to existing connections, under the control of the terminal which is the proprietor of the call.

Inviting one or more attached terminals to no longer be parties to a call under the control of the terminal which is the proprietor of the call.

Detaching the terminal from a call, at its initiative, and notification to the proprietor of the call.

Creating one or more connections in a call.

Attaching to a connection one or more terminals which are parties to a call under the control of the terminal which is the proprietor of the connection.

Detaching one or more terminals from a connection under the control of the terminal which is the proprietor of the connection.

Modifying the characteristics of a connection, by the terminal which is the proprietor of the connection.

Detaching from a connection a terminal which is not the proprietor of the connection, at the initiative of this terminal, and notifying the terminal which is the proprietor of the connection.

Clearing down one or more connections, by the terminal which is the proprietor of the connection or connections.

Clearing down a call, by the proprietor of the call.

Reporting the status of a call.

Reporting the status of a terminal which is a party to a call, to the terminal which is the proprietor of that call.

Reporting on the status of a connection to the terminal which is the proprietor of that connection.

Transferring the ownership of a call from the proprietor terminal to another terminal which is not a proprietor of the call.

The following description considers the following operations, by way of example: attaching and detaching a terminal to a call; attaching and detaching a terminal to connections. It mentions the corresponding modifications in the matrix defining the fine states in all the entities concerned. The calls considered are multipoint calls, since this is the most complex situation.

FIG. 5 shows the exchange of messages in the case of an operation in which a terminal TA which is the proprietor of a call invites a terminal TC to become a party to the call. A terminal TB is already a party to the call and is connected to the terminal TA by three connections C1, C2, C3 via two nodes N1 and N2 of a network N. In this example the terminal TA includes a central unit UCA and three peripheral devices PA1, PA2, PA3 respectively dedicated to sending/receiving data, sending video pictures and sending/receiving sound. The terminal TB includes a central unit UCB and three peripheral devices PB1, PB2, PB3 respectively dedicated to sending/receiving data, receiving video pictures and sending/receiving sound. The terminal TC includes a central unit UCC and two peripheral devices PC1 and PC2, the former dedicated to sending/receiving data and the later dedicated to sending/receiving video pictures, for example. The connection C1 is a bidirectional connection transmitting data. The connection C2 is a unidirectional connection transmitting video pictures. The connection C3 is a bidirectional connection transmitting sound.

When the signalling device of the terminal TA sends a message ADP (TC) (ADD PARTY TC) requesting the operation of attaching the terminal TC to the call, the signalling device activates an automaton specific to the call and specific to the operation. It is analogous to the automaton whose states are represented in FIG. 3 and described above. It executes the subsystem SA2 since this is a four message operation.

Before sending the message ADP (TC) it is in the stable state AS corresponding to the fact that the call has already been set up. After the terminal TA has sent the message ADP (TC) (ADD PARTY TC) inviting the terminal TC to attach to the call in question, the automaton enters the unstable state AOI. The automaton then enters the unstable state AOP when it receives a message ADPP (ADD PARTY PROCEEDING) meaning that the node N1 has received the message ADP (TC) and that it can forward it to TC. Finally, the automaton returns to the stable state AS when it receives a message PAD (PARTY ADDED) meaning that the terminal TC to which the message ADP (TC) is addressed has received the message and can execute the requested operation. The message PAD is a global acknowledgement which is broadcast to all the entities of the network.

A matrix is memorized in TA, TB, TC, N1, N2, N3 to define fine states within the states of the automata used in the signalling devices of these entities. Consider for example the matrix memorized in the signalling device of the terminal TA.

FIG. 6 shows respectively on the left and on the right the content of the matrix when the automaton is in the stable state AS before attachment of the terminal TC and then when it has returned to the active state AS after attachment of the terminal TC. Before attachment of the terminal TC the matrix comprises only two rows respectively corresponding to the terminal TA and to the terminal TB and three columns respectively corresponding to the three connections C1, C2, C3. The six boxes of the matrix respectively contain six binary data represented by black squares indicating that the terminals TA and TB are each parties to the call and are connected to the three connections C1, C2, C3. When the terminal TC has been attached to the call the six boxes of the matrix corresponding to the terminals TA and TB still have the same content but the matrix includes an extra row corresponding to the terminal TC. This row comprises three boxes, shown blank, whose contents are three binary data indicating that the terminal TC is a party to the call but is not connected to connections C1, C2, C3.

The node N1 includes a signalling device (not shown) which may comprise a processor and a program memory, which operate in the following manner. When it receives the message ADP (TC) it activates an automaton specific to the call and specific to the attachment operation, in order to forward the message. This is an automaton analogous to that whose states are shown in FIG. 3 and described above. It executes the subsystem SA2 since this is a four message operation.

The node N1 forwards the message ADP (TC) to a node N3 which routes the message to the destination terminal TC. The node N1 then receives the local acknowledgement message ADPP supplied by the node N3. Finally it receives the global acknowledgement message PAD which is transmitted throughout the network. The signalling device of the node N1 also memorizes the matrix defining the fine states. Its content undergos the modification shown in FIG. 7 and described previously for the matrix memorized in the terminal TA: this content is updated by adding the line corresponding to the terminal TC when the node N1 receives the global acknowledgement message PAD.

The node N3 is analogous to the node N1 and includes a signalling device whose operation is analogous to that of the node N1 and to that of the terminal TA. When it receives the message ADP (TC) it activates an automaton specific to the call and specific to the attachment operation. This is an automaton analogous to that whose states are shown in FIG. 3 and described previously. Any difference compared to the signalling devices of the terminal TA and the node N1 consists in the fact that the node N3 does not forward the message ADP (TC) but instead replaces it with a message SU (SET UP) commanding the terminal TC to execute the attachment; and in the fact that the terminal TC sends a local acknowledgement message CP (CALL PROC) instead of ADP. Also, when it receives the message ADP (TC) the signalling device of the node N3 does not yet memorize the matrix defining the fine states. It constructs a matrix identical to that memorized by the terminal TA and by the node N1 from data in the message ADP (TC) supplied to it by the node N1.

The terminal TC includes a signalling device comprising its central unit UCC and a program memory. This signalling device activates a simple automaton (not shown in the figures) which decides if it can execute the requested operation or if it must reject the request. Depending on the outcome, it sends a local acknowledgement message CP and a global acknowledgement message PAD or it sends a reject message (not shown in FIG. 5).

The signalling device of the terminal TC further includes an automaton analogous to that whose states are shown in FIG. 3 and described previously. However, this automaton is activated only when the terminal sends a message requesting an operation to be carried out.

When it receives the message SU the terminal TC does not yet memorize the matrix defining the fine states. If it accepts to be a party to the call it constructs a matrix identical to that memorized by the terminal TA and by the nodes N1 and N3 from data contained in the message SU supplied by it to the node N3 to which it is attached.

During this operation of attaching the terminal TC the signalling devices of the node N2 and of the terminal TB also update their matrix defining fine states for this call by adding the row corresponding to TC when they receive the global acknowledgement message PAD because the operations applying to the terminal TC concern them, this call being of the multipoint type.

On the other hand, the entities which are not concerned, i.e. the terminals which are not parties to the call and the nodes which are not used as intermediaries for routing messages between the terminals which are parties to the call, do not memorize the matrix defining fine states for the call. Consequently, they ignore global acknowledgements concerning reception of this call. To simplify FIG. 5 the network N shown comprises only entities that the call in question concerns.

The case of a point-to-multipoint call would be simpler. There is then only one terminal which sends data to the others. This terminal is the proprietor of the call. The status of all the other terminals vis-a-vis all the connections set up by the call concern it. However, only by their status vis-a-vis connections which can connect them to the terminal which is the proprietor of the call concern any of the other terminals. Each terminal which is not a proprietor of the call memorizes a simplified matrix which indicates only the connection to which it is attached and the terminals using connections through this node for the call in question.

FIGS. 7 and 8 show the converse operation, i.e. the operation of detaching from the terminal TC a call to which the terminals TA, TB, TC are parties. As for the attachment operation, the terminal TA and the nodes N1, N3 each activate an automaton specific to the call and specific to the operation. This is an automaton analogous that whose states are shown in FIG. 3 and described previously. To be more precise, this automaton executes the subsystem SA3 because the operation of detaching a terminal is a two message operation: the global acknowledgement message and the reject message do not apply to this operation.

The terminal TA sends a message DDP (TC) (DROP PARTY TC) inviting the terminal TC no longer to be a party to the call in question. The automaton of the terminal TA then changes from the stable state AS corresponding to the fact that the call has been set up previously to the unstable state IRI in which it waits for a local acknowledgement. The node N1 sends a local acknowledgement message DPC (DROP PARTY COMPLETE) to the terminal TA to tell it that the node N1 will route the message. The automaton of the terminal TA then returns to the stable state AS.

The node N1 then forwards the message DPC (TC) which is addressed to terminal TC to the node N3. The signalling device of the node N3 forwards the message DPC (TC) to terminal TC. The signalling device of the node N1 then activates an automaton specific to this call and to this operation. This is an automaton analogous to that whose states are shown in FIG. 3 and described previously. To be more precise, this automaton executes the subsystem SA3 because the operation of detaching a terminal is a two message operation. The node N3 sends a local acknowledgement message DPC to the node N1. The automaton of the latter then returns to the stable state AS.

The node N3 then forwards the message DDP (TC) in a different form: a message RE (RELEASE) commanding the terminal TC to detach from the call. The latter responds with a local acknowledgement message RC (RELEASE COMPLETE). The signalling device of the node N3 activates an automaton specific to this call and to this operation. This is an automaton analogous to that whose states are shown in FIG. 3 and described previously. To be more precise, this automaton executes the subsystem SA3. It changes from the state AS to the unstable state IRI when it sends the message RE and then returns to the stable state AS when it receives the local acknowledgement message RC.

The terminal TC does not send any global acknowledgment. On the other hand, the local acknowledgement message RC is broadcast throughout the network N so that the other entities which the detachment of the terminal TC concerns can update their matrix. In this example, in which the call is a multipoint call, the detachment of the terminal TC concerns the node N2 and the terminal TB because it will prevent them sending data to terminal TC.

FIG. 8 shows the modification undergone by the matrix defining fine states during this detachment operation in the signalling devices of all the entities which this detachment concerns, i.e. TA, TB, TC, N1, N2, N3 in this multipoint call. Consider, for example, the matrix memorized in the signalling device of the terminal TA. Before carrying out this operation the automaton of the terminal TA is in its stable state AS and the matrix includes three columns corresponding to the connections C1, C2, C3 and three rows corresponding to the terminals TA, TB and TC. After the detachment of terminal TC has been completed, the automaton of terminal TA returns to its stable state AS but the matrix then includes only two rows corresponding to the terminals TA and TB.

FIGS. 9 and 12 show one implementation of the protocol of the invention for the operation of attaching a terminal TC to a connection C2 already set up for a call and a new connection C4 which is set up especially for the terminal TC. Three terminals TA, TB, TC are already parties to the call. Three connections C1, C2, C3 already connect the terminals TA and TB. The connection C2 is a unidirectional connection conveying video pictures. It is therefore possible to connect to C2 any number of terminals for broadcasting these pictures.

The connection C1 is a bidirectional connection conveying data. It is not possible to attach to C1 one or more terminals in addition to TB, as this would produce an addition of bit rates which would be difficult to manage. It is therefore necessary to create an additional bidirectional connection C4 to enable the terminal TB to send and receive data from and to the terminal TA independently of the connection C1. Assume, for example, that the terminal TA is the proprietor of the three connections C1, C2, C3. The terminal TA is therefore the only terminal which has the right to invite the terminal TC to attach to the connections C2 and C4.

The signalling devices of the terminal TA, the node N1 and the node N3 each activate an automaton specific to this call and specific to this operation. Each of these automata is analogous to that whose states are shown in FIG. 3 and previously described. It executes only the subsystem SA2 as the operation of attaching the terminal to a connection is a four message operation. Only the names of the messages are different for the operation in question. The terminal TA sends a message ATP (C2, TC) (ATTACH PARTY C2, TC). The automaton of the terminal TA changes from the stable state AS corresponding to the fact that the call has already been set up to the unstable state AOI. The node N1 sends the terminal TA a local acknowledgment message ATTP (ATTACH PARTY PROCEEDING). The automaton of the terminal TA then changes to the unstable state AOP in which it waits for a global acknowledgement message. The message ATP (C2, TC) is forwarded by the node N1 to the node N3. The latter sends a local acknowledgement message ATTP to the node N1 and then forwards the message ATP (C2, TC) to the terminal TC. The terminal TC sends a local acknowledgement message ATTP to node N3. It attaches to the connection C2 and then sends a global acknowledgement message PAT (PARTY ATTACHED) which is broadcast to all the entities of the network.

This message is acted on by all the entities that the attachment of the terminal TC to the connection C2 concerns, for modification of the matrix defining fine states. As the call is of the multipoint type, this operation concerns all the terminals TA, TB, TC and the nodes N1, N2, N3. The automata of the nodes N1 and N3 execute the subsystem SA2 like the automaton of the terminal TA. In the signalling device of the terminal TC reception of the message ATP (C2, TC) activates a simple automaton which decides if it can execute the requested operation or if it must reject the request. After executing the operation this signalling device updates the content of the matrix that it memorizes.

FIG. 10 shows the modification of the matrix defining fine states. This modification is carried out identically in the signalling devices of all entities that this operation concerns: TA, TB, N1, N2, N3, when they receive the global acknowledgement message PAT. The signalling device of the terminal TC updates its own matrix when this terminal has been attached to the connection C2.

In the terminal TA, for example, before the attachment of TC to C2, the automaton is in the active state AS and the matrix includes three columns corresponding to the connections C1, C2, C3 and three rows corresponding to the terminals TA, TB, TC. The rows corresponding to TA and TB include binary data indicating that these two terminals are both connected to the three connections C1, C2, C3. The row corresponding to the terminal TC includes binary data indicating that the terminal TC is not attached to any of the connections C1, C2, C3. When TC has been attached to C2, the automaton of the terminal TA returns to its stable state AS but the content of the matrix includes binary data indicating that the terminal TC has been attached to the connection C2.

FIGS. 11 and 12 show the setting up of the additional connection C4 to enable the terminal TC to exchange data with the terminal TA. The signalling devices of the terminal TA, the node N1 and the node N3 each activate an automaton specific to this call and specific to this operation. Each of these automata is analogous to that whose states are shown in FIG. 3 and described previously. It executes only the subsystem SA2 because the operation of setting up a connection is a four message operation. Only the names of the messages are different for the operation in question. The terminal TA sends a message ADC (C4, TC) (ADD CONNECTION C4, TC). The automaton of the terminal TA changes from the stable state AS corresponding to the fact that the call has already been set up to the unstable state AOI. The node N1 sends to the terminal T1 a local acknowledgement message ADCA (ADD CONNECTION ACK.). The automaton of the terminal TA then goes to the unstable state AOI in which it waits for a global acknowledgement message. The message ADC (C4, TC) is forwarded by the node N1 to the node N3. The latter sends an acknowledgement message ADCA to the node N1 and then forwards the message ADC (C4, TC) to the terminal TC.

The nodes N1 and N3 set up the connection C4. The terminal TC sends a local acknowledgement message ADCA to the node N3. It is attached to the connection C4 and then sends a global acknowledgement message ADCD (ADD CONNECTION DONE) which is broadcast to all the entities of the network. This message is acted on by all the entities which the setting up of the connection C4 concerns, to modify the content of the fine state matrix. As the call is of the multipoint type, this operation concerns all the terminals TA, TB, TC and the nodes N1, N2, N3.

The automata of the nodes N1 and N3 execute the subsystem SA2 like the automaton of the terminal TA. On receiving the message ADC (C4, T4) the signalling device of the terminal TC activates a simple automaton which decides if it can execute the operation requested or if it must reject the request. After the operation is executed the signalling device updates the content of the matrix that it memorizes.

Note that the attachment to the connection C2 could have been effected after the creation of the connection C4 and the attachment of TC to C4, instead of before the latter.

FIG. 12 shows the modification of the matrix defining fine states. This modification is applied identically in the signalling devices of all the entities that this operation concerns: TA, TB, N1, N2, N3, when they receive the global acknowledgement message ADCD. The signalling device of the terminal TC updates its own matrix when it has been attached to the connection C4.

In the terminal TA, for example, before the attachment of TC to C4, the automaton is in the active state AS and the matrix comprises three columns corresponding to the connections C1, C2, C3 and three rows corresponding to the terminals TA, TB, TC. The rows corresponding to the terminals TA and TB contain binary data indicating that these two terminals are both connected to the three connections C1, C2, C3. The row corresponding to the terminal TC contain binary data indicating that the terminal TC is attached only to the connection C2.

When TC has been attached to C4 the automaton of the terminal TA returns to its stable state AS but the content of the matrix includes binary data indicating that the terminal TC is attached to the connections C2 and C4.

FIGS. 13 and 14 show the execution of the converse operation, i.e. detachment of the terminal TC from the connections C4 and C2 in response to an invitation sent by the terminal TA. The terminal TC remains a party to the call. The signalling devices of the terminal TA, the node N1 and the node N3 each activate an automaton specific to this call and specific to this operation. This is an automaton similar to that the states of which are shown in FIG. 3 and described previously. It executes only the subsystem SA3 because this operation is of the four message type. Only the messages are different. The terminal TA sends a message DTP (C4, C2, TC) (DETACH PARTY C4, C2, TC). This message is forwarded by the node N1 and the node N3 to the terminal TC. The nodes N1 and N3 and the terminal TC send local acknowledgement messages DTPP (DETACH PARTY PROCEEDING). The terminal TC also sends a global acknowledgement message PD (C4, C2, TC) (PARTY DETACHED C4, C2, TC) which is broadcast to all the entities. In particular, it is forwarded by the node N3 and the node N1 to the terminal TA and by the node N2 to the terminal TB.

FIG. 14 shows the modification of the matrix of fine states in the terminal A, for example. If the operation has not been completed, the automaton of the terminal TA is in its stable state AS and the matrix of fine states includes: four columns corresponding to the four connections C1, C2, C3, C4 and three rows corresponding to the three terminals TA, TB, TC. It contains binary data indicating that both terminals TA and TB are attached to the three connections C1, C2, C3 and that the terminal TC is attached only to the two connections C4 and C2. When the operation has been completed the automaton returns to its stable state AS and the matrix of fine states is updated under the control of the global acknowledgement message PD (C4, C2, TC). The row corresponding to the terminal TC then contains binary data indicating that the terminal TC is not attached to any of the four connections C1, C2, C3, C4. The terminal TA which is the proprietor of the connection C4 can then decide either to request attachment of another terminal to the connection C4 or to request clearing down of this connection.

FIGS. 15 and 16 show the operation of clearing down the connection C4 when the terminal TC remains a party to the call, at least temporarily. The signalling devices of the terminal T1, the node N1 and the node N3 each activate an automaton specific to this call and specific to this operation. Each of these automata is analogous to that the states of which are shown in FIG. 3 and described previously. It executes only the subsystem SA3 because the operation of clearing down a connection is a two message operation. Only the names of the messages are different for the operation in question. The terminal TA sends a message DRC (C4) (DROP CONNECTION C4). The node N1 sends to the terminal TA a local acknowledgement message DRCA (DROP CONNECTION ACK.) and forwards the message DRC (C4) to the node N3. The latter clears down the connection C4 and then broadcasts a local acknowledgement message DRCA throughout the network. This message is acted on by all the entities that the clearing down of the connection C4 concerns. The call being of the multipoint type, this clearing down concerns TA, TB, TC, N1, N2, N3.

FIG. 16 shows the modification of the matrix defining fine states. This modification is applied identically in the signalling devices of the entities TA, TB, TC, N1, N2, N3 when they receive the message DRCA broadcast through the network. In the terminal TA, for example, before clearing down C4, the automaton of the terminal is in its stable state AS; the matrix includes four columns respectively corresponding to C1, C2, C3, C4. The matrix contains binary data indicating that none of the terminals TA, TB, TC is attached to C4. After clearing down C4, this automaton returns to its stable state AS but the matrix now includes only three columns respectively corresponding to the connections C1, C2, C3.

The protocol of the invention is applicable to other operations concerning: the status of a call, the status of a terminal vis-a-vis a call, the status of a terminal vis-a-vis a connection, or a characteristic of a connection. In particular, it is possible in some cases to request an increase in the bandwidth of a connection already attached to the terminal in question, instead of requesting the setting up of an additional connection, or instead of requesting attachment to another connection already set up but which is not attached to the terminal in question.

The protocol of the invention is applicable to all types of network (integrated services or other networks, broadband or narrowband networks).

I claim:

1. A signalling protocol supporting multimedia services for a telecommunications network including a plurality of entities: terminals, including multimedia terminals (TA, TB, TC), and switching nodes (N1, N2, N3) setting up connections between these terminals when a call is set up; each entity including a signalling device for sending and receiving signalling messages; this protocol comprising activating, in the signalling device of a first entity (TA or N1 or N2), which is a party to a call, an automaton (SA1, SA2, SA3) which can be in:

a stable idle state (IDL), to which it returns when the call is cleared down;

an active stable state (AS) which it enters when the call is set up;

this protocol being characterized in that it further comprises:

having this automaton change from the active stable state (AS) to a first unstable state (AOI) when a first entity (TA or N1 or N3) sends or forwards a request (ORq) addressed to a second entity (TB), this request asking for execution of an operation of a first type;

then having this automaton change from the first unstable state (AOI) to a second unstable state (AOP) when the first entity receives a local acknowledgment (OLA) indicating that the request (ORq) has been received by the second entity (TC) or has been received and then forwarded by an intermediate entity (N1 or N3) between the first and second entities;

then having this automaton change from the second unstable state (AOP) to the active stable state (AS) when the first entity (TA or N1 or N2) receives either a global acknowledgement (OD) indicating that the operation requested has been executed by the second entity (TC) or a message (ORj) indicating that the request has been rejected by the second entity (TC) or an intermediate entity (N1 or N3);

having this automaton change from the active stable state (AS) to a third unstable state (IRI) when a first entity (TA or N1 or N3) sends or forwards a request (IRRq) addressed to a second entity (TC), this request asking for the execution of an operation of the second type;

then having this automaton change from the third unstable state (IRI) to the active stable state (AS) when the first entity (TA or N1 or N3) receives either a local acknowledgement (IRRLA) indicating that the request has been received from the second entity (TC) or has been received and then forwarded by an intermediate entity (N1 or N3) between the first and second entities;

and in that it further comprises:

subdividing each state (AS, AOI, AOP, IRI) of said automaton into a plurality of fine states respectively defined by values of a matrix (M) whose columns correspond to respective connections (C1, C2, C3) set up for this call (CR); the rows of which correspond respectively to the terminals (TA, TB, TC) which are parties to this call; and containing binary data representing the status of each terminal (TA, TB, TC) vis-a-vis each connection (C1, C2, C3) set up for this call;

memorizing at least part of this matrix in the signalling device of each entity (TA, TB, TC, N1, N2, N3) which a call concerns;

updating the matrix (M) of the automaton of each of the entities (TA, TB, TC, N1, N2, N3) that an operation concerns when this entity receives a message concerning this operation and the message indicates a change of state of a terminal (TA, TB, TC) which is a party to the call in question vis-a-vis this call and/or vis-a-vis the connections set up for this call;

using this matrix (M) as a variable for this protocol.

2. A protocol according to claim 1 characterized in that, for each call, it further consists in allocating to a single terminal called the proprietor of the call:

the right to invite at least one other terminal to be a party to this call;

the right to invite at least one other terminal to no longer be a party to this call;

the right to clear down this call;

the right to transfer all of the above rights to another terminal which is a party this call, in the case where the call request has set up a bidirectional multipoint call.

3. A protocol according to claim 2 characterized in that, for each connection, it further consists in allocating to a single terminal called the proprietor of this connection:

the right to invite a terminal to be attached to this connection;

the right to invite a terminal to be detached from this connection;

the right to request a modification of the characteristics of this connection;

the right to request the clearing down of this connection;

the right to be detached from this connection at its own initiative.

* * * * *